United States Patent
Giacomoni et al.

(10) Patent No.: US 10,091,049 B2
(45) Date of Patent: Oct. 2, 2018

(54) SCRIPTING FOR IMPLEMENTING POLICY-BASED TRAFFIC STEERING AND MANAGEMENT

(71) Applicant: F5 Networks, Inc., Seattle, WA (US)

(72) Inventors: John Giacomoni, Longmont, CO (US); Manish Vachharajani, Lafayette, CO (US); Mark Terrel, Denver, CO (US)

(73) Assignee: F5 Networks, Inc., Seattle, WA (US)

( * ) Notice: Subject to any disclaimer, the term of this patent is extended or adjusted under 35 U.S.C. 154(b) by 823 days.

(21) Appl. No.: 13/970,493

(22) Filed: Aug. 19, 2013

(65) Prior Publication Data

US 2014/0052838 A1 Feb. 20, 2014

Related U.S. Application Data

(60) Provisional application No. 61/684,650, filed on Aug. 17, 2012.

(51) Int. Cl.
  *H04L 12/24* (2006.01)
  *H04L 12/715* (2013.01)
  *H04L 12/813* (2013.01)

(52) U.S. Cl.
  CPC .......... *H04L 41/00* (2013.01); *H04L 41/0893* (2013.01); *H04L 45/64* (2013.01); *H04L 47/20* (2013.01)

(58) Field of Classification Search
  CPC ..... H04L 41/0893; H04L 47/20; H04L 41/00; H04L 45/64
  USPC ........................................... 709/223; 703/223
  See application file for complete search history.

(56) References Cited

U.S. PATENT DOCUMENTS

| | | | | |
|---|---|---|---|---|
| 7,248,575 B2* | 7/2007 | Leslie | ............... | H04L 29/06027 370/352 |
| 7,733,891 B2* | 6/2010 | Reynolds | ............ | H04L 12/2602 370/412 |
| 7,966,412 B2* | 6/2011 | Luik | ....................... | H04L 67/34 709/230 |
| 8,495,181 B2* | 7/2013 | Venkatraman | ...... | H04L 63/0227 709/202 |
| 8,533,308 B1* | 9/2013 | Rothstein | ............ | H04L 67/1002 370/229 |
| 8,595,752 B1* | 11/2013 | Fioravanti | ............... | G06F 9/541 709/203 |
| 8,635,265 B2* | 1/2014 | Reeves | ............. | H04L 29/12066 709/203 |
| 8,825,732 B2* | 9/2014 | Piernot | .................... | G06F 9/546 379/10.03 |
| 2007/0156727 A1* | 7/2007 | Lim | ..................... | G06F 21/6218 |
| 2010/0325588 A1* | 12/2010 | Reddy | ................. | H04L 63/0263 715/853 |

* cited by examiner

*Primary Examiner* — Kevin Bates
*Assistant Examiner* — Nazia Naoreen
(74) *Attorney, Agent, or Firm* — Holland & Hart LLP

(57) ABSTRACT

Methods, systems, and devices are described for managing network communications. A traffic manager module may receive a script over a management plane of a packet core, interpret the script to identify a traffic management policy; and dynamically modify at least one aspect of a proxy connection over a bearer plane of the packet core at the traffic manager module based on the identified traffic management policy.

23 Claims, 9 Drawing Sheets

SCRIPTING FOR IMPLEMENTING POLICY-BASED TRAFFIC STEERING AND MANAGEMENT

CROSS-REFERENCE TO RELATED APPLICATION

The present application claims priority from U.S. Provisional Application No. 61/684,650, entitled "SCRIPTING FOR IMPLEMENTING POLICY-BASED TRAFFIC STEERING AND MANAGEMENT," filed Aug. 17, 2012, the entire disclosure of which is incorporated herein by reference for all purposes.

BACKGROUND

The present invention relates to network traffic management, and more particularly, to the controlled optimization of network traffic using a proxy network traffic manager module.

Many computer network systems rely on the use of optimization services serially integrated into a network path to streamline the flow of data, provide efficient use of network resources, or improve quality of service. For example, this type of architecture is often found in cellular networks. With the proliferation of smartphones and tablet devices in recent years, the demand for streaming video on mobile devices has grown significantly. Thus, to conserve bandwidth, many cellular networks have integrated video optimizers into their network paths. These video optimizers may pre-process video files requested by smart devices to shrink the size of the video files and reformat the video files to the display capabilities of the smart devices. The processed video and reformatted video file may then be streamed to the requesting.

However, because video optimizers and other performance enhancing services are typically placed in-line with a network path, these services may be end up processing all network traffic, regardless of whether the function of the service. For example, a text file requested by a mobile device may be passed through a video optimizer even though the text file is not enhanced by the functionality of the video optimizer. Thus, the placement of video optimizers and other performance enhancing services serially in a network path may unnecessarily consume network resources and decrease the scalability of the network.

SUMMARY

Methods, systems, and devices are described for increasing the efficiency and scalability of performance enhancement functionality in a network.

According to a first set of illustrative embodiments, a method of managing network communications may include receiving a script at a traffic manager module over a management plane of a packet core; interpreting the script at the traffic manager module to identify a traffic management policy; and dynamically modifying at least one aspect of a proxy connection over a bearer plane of the packet core at the traffic manager module based on the identified traffic management policy.

In certain examples, dynamically modifying the at least one aspect of the proxy connection may include forwarding a message associated with the proxy connection over the bearer plane to a network device identified by the script.

In certain examples, dynamically modifying the at least one aspect of the proxy connection may include terminating a request associated with the proxy connection over the bearer plane and instructing a source of the request to reissue the request to a network device identified by the script.

In certain examples, dynamically modifying the at least one aspect of the proxy connection may include creating a storage object based on the script.

In certain examples, dynamically modifying the at least one aspect of the proxy connection may include loading a software extension defined by the script at the traffic manager module and using the software extension to communicate with one or more network devices based on the script.

In certain examples, dynamically modifying the at least one aspect of the proxy connection may include manipulating at least one object received at the traffic manager module over the proxy connection based on the script.

In certain examples, dynamically modifying the at least one aspect of the proxy connection may include performing a demotion on one or more packets associated with the proxy connection based on the script. The demotion may include demoting the proxy connection to a lower network layer.

In certain examples, a new connection may be established at the traffic manager module with a network device identified by the script received over the management plane of the packet core. The traffic manager module may load a protocol driver specified by the script and use the protocol driver to communicate with a service of the network device identified by the script.

In certain examples, a garbage collection operation of the traffic manager module may be manipulated based on the script.

In certain examples, a system state of the traffic manager module may be modified based on the script.

According to a second set of illustrative examples, a traffic manager module may include at least one processor and a memory communicably coupled with the at least one processor. The memory may be configured to store code that, when executed by the at least one processor, causes the at least one processor to receive a script over a management plane of a packet core; interpret the script to identify a traffic management policy; and dynamically modify at least one aspect of a proxy connection over a bearer plane of the packet core based on the identified traffic management policy.

In certain examples, the code may cause the at least one processor to implement one or more aspects of the method described above with respect to the first set of illustrative embodiments.

According to a third set of illustrative embodiments, a computer program product may include a tangible computer-readable medium comprising computer-readable program code stored thereon. The computer-readable program code may be configured to cause at least one processor to receive a script over a management plane of a packet core; interpret the script to identify a traffic management policy; and dynamically modify at least one aspect of a proxy connection over a bearer plane of the packet core based on the identified traffic management policy.

In certain examples, the computer-readable program code may be configured to cause the at least one processor to implement one or more aspects of the method described above with respect to the first set of illustrative embodiments.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, and devices are described for managing network communications. A traffic manager module may receive a script over a management plane of a packet core, interpret the script to identify a traffic management policy; and dynamically modify at least one aspect of a proxy connection over a bearer plane of the packet core at the traffic manager module based on the identified traffic management policy.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
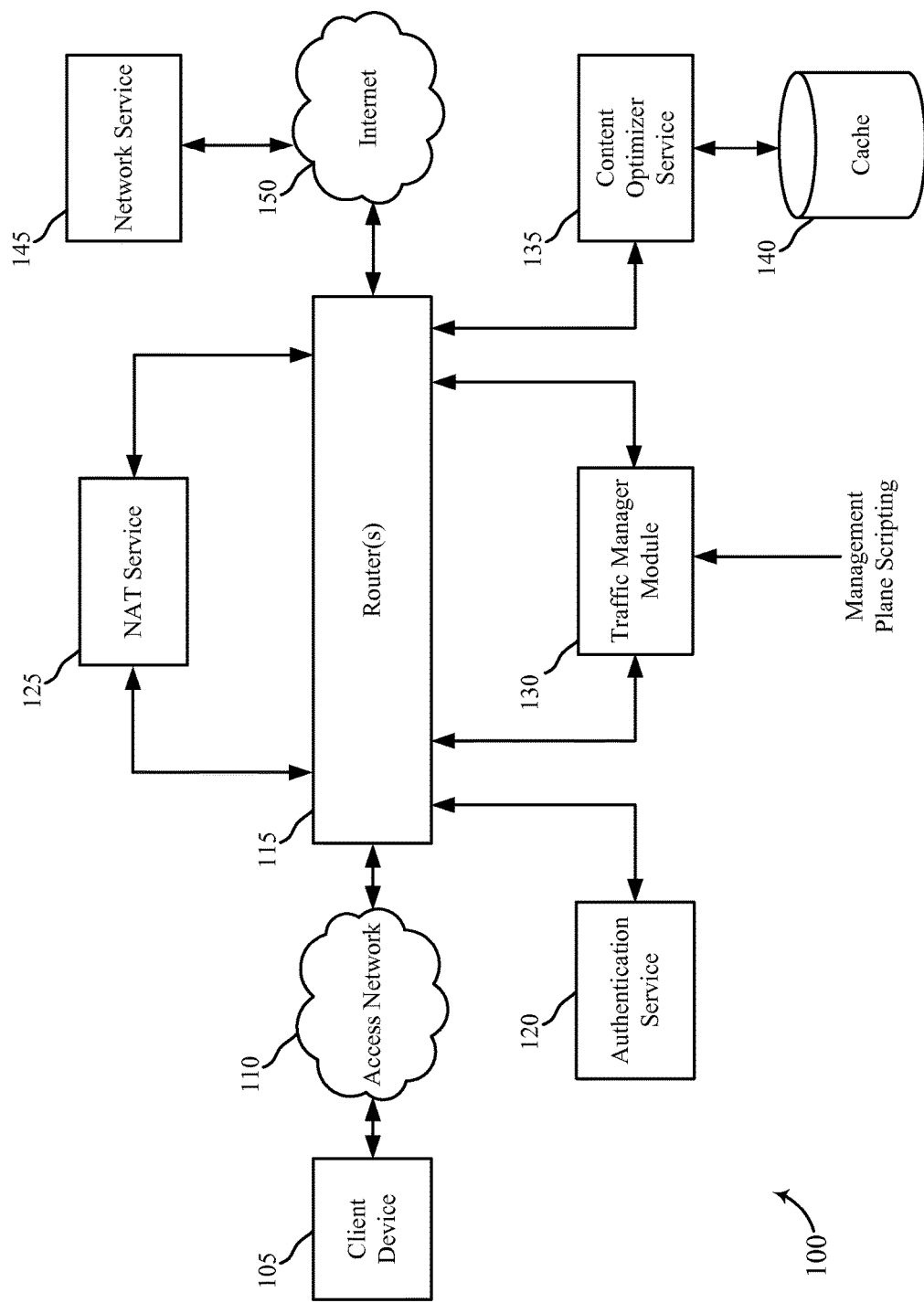
FIG. 1 is a block diagram of an example of a network incorporating a traffic manager module according to various embodiments of the invention.

FIG. 1 is a block diagram of an example of a network system 100 incorporating a traffic manager module 130 that operates as a proxy to enhance network performance. The system 100 of the present example may include a client device 105, an access network 110, one or more network routers 115, an authentication service 120, a Network Address Translation (NAT) service, the traffic manager module 130, at least one content optimizer service 135, a content cache 140, and one or more network services 145 available over a connection to the Internet 150 or another packet data network. Each of the services 120, 125, 135, 145 of FIG. 1 may be implemented by one or more network devices (e.g., servers). Each of the components of FIG. 1 may be in communication with the other components, directly or indirectly.

In certain examples, the client device 105 may be a mobile device and the access network 110 may be a radio access network, but the principles of the present description are not limited to such embodiments. Those having skill in the art will recognize that other types of devices and networks may be used. Similarly, the inventive principles of the present description are not limited to systems including an authentication service 120 or a NAT service 125. Rather, additional or alternate services or network devices may be used as may suit a particular application of the principles described herein. In certain examples, one or more of the authentication service 120, the NAT service 125, the content optimizer service 135, or another network service 145 may be subsumed into the traffic manager module 130.

The traffic manager module 130 may serve as a proxy between the client device 105 and at least one of the services 120, 125, 135, 145. In the present example, the client device 105 may attempt to access the Internet 150 and/or one of the services 120, 125, 135, 145, but may not be granted access until the authentication service 120 confirms that an account or user associated with the client device 105 is authorized to access the network. In certain examples, this authorization may be based on an identity of the client device 105. Additionally or alternatively, the authorization may be based on one or more authentication credentials provided by the client device 105 to authenticate the identity of a user of the client device 105.

Once the authentication service 120 has authenticated the client device 105, the client device 105 may be permitted to send messages requesting network objects (e.g., files, web pages, etc.) or access other services over the network. The router(s) 115 may be configured such that certain messages from the client device 105 received over the access network 110 may be sent to the traffic manager module 130 and other types of messages may be sent to the NAT service 125. For example, the router(s) 115 may be configured to direct all messages from the client device 105 that are associated with Transport Control Protocol (TCP) port 80 to the traffic manager module 130. Other types of messages from the client device 105 may be routed directly to the NAT service 125 for resolution and further routing to an appropriate network service 145.

It will be understood that the authentication service 120 of the present example may at any time insert or update the credentials and policies associated with a user. Additionally or alternatively, the traffic manager module 130 may request updated credentials and policies from the authentication service 120 at any time.

The traffic manager module 130 may be configured to act as a proxy with respect to certain messages issued by the client device 105. Thus, the traffic manager module 130 may establish connections (e.g., TCP sessions) with the client device 105. The traffic manager module 130 may also establish connections with services 120, 125, 135 on behalf of the client device 105. In certain examples, the traffic manager module 130 may be implemented by hardware executing special-purpose code. For example, the traffic manager module 130 may be implemented by a server running special-purpose software. Alternatively, the traffic manager module 130 may be implemented entirely by hardware.

By acting as a proxy, the traffic manager module 130 may take performance enhancing actions to optimize the processing of messages from the client device 105 and responses to those messages from services 135, 145. Thus, the traffic manager module 130 may receive incoming TCP or other layer 4 packets related to a message from the mobile client device 105 or a response to such a message from a service 135, 145. In certain examples, the traffic manager module 130 may analyze the application layer (layer 7) content of the packets for the message and/or the response and take certain actions with respect to one or more connections or objects based on the analysis of the application layer content and a set of rules enforced by the traffic manager module 130. Additionally or alternatively, the performance enhancing actions may be taken based on non content-specific triggers (e.g., rules, timers, etc.) or on a per-transaction basis.

The performance enhancing functionality of the traffic manager module 130 may be dynamically configured based on input received from an administrative user or process over a management plane. As explained in more detail below, the traffic manager module 130 may implement an interface by which one or more scripts may be provided to the traffic manager module 130. The script(s) may be interpreted at the traffic manager module 130-*a* to define parameters, rules and other data that set forth the criteria under which certain performance enhancing actions may be taken. As described above, the criteria may be based on one or more of: the application layer content of packets received on a connection, per-transaction/per-connection rules, external or internal events (e.g., timers, messages, sensor or peripheral input, etc.), or rules with general applicability to all transactions or packets.

As described in more detail below, examples of such actions that may be taken by the traffic manager module 130 include but are not limited to: 1) redirecting a message or response to the message to an appropriate server or service based on the application layer content of one or more packets related to the message or the response, 2) terminating and reissuing a request to a different server or service based on the application layer content of one or more packets related to a message or a response, 3) splicing data from a first connection to another connection based on the application layer content of one or more message or response packets, 4) establishing new connections, 5) storing and replaying certain aspects of messages or responses to messages, 5) creating storage objects, 6) loading software extensions (e.g., protocol drivers), 7) changing connection properties, 8) manipulating request or response objects, 9) mitigating garbage collection pause time, 10) changing a state of the traffic manager module 130, 11) demoting layer 7 connections to lower layer connections, 12) manipulating Quality of Service (QoS) or Type of Service (ToS) parameters associated with individual connections or messages, or 13) other performance enhancement actions that may suit a particular application of the principles described herein.

The actions taken by the traffic manager module 130 with respect to the connections may speed up or otherwise optimize the processing and handling of requests from the client device 105. As one example of how this optimization may be implemented, consider the case of content optimization. Content optimizer services 135 may reformat, re-encode, or otherwise convert objects or files requested by the client device 105 into a format that is appropriate for the bandwidth and form factor constraints of the client device 105. One type of content optimizer service 135 is a video optimizer service. In some networks, for example, video optimizer services are placed in networks serially such that all files transmitted to the client device 105 pass through the video optimizer service, regardless of whether the files are video files or other types of files that are not relevant to the video optimizer service. Such configurations may increase network overhead and be difficult and expensive to scale.

By contrast, the present system 100 may use the traffic manager module 130 to optimize requests for certain types of files and responses to those requests by acting as a proxy for the client device 105. An administrative user or process may use a script to programmatically instruct the traffic manager module 130 to inspect the application layer content of packets directed to and from the client device 105. If the traffic manager module 130 identifies a packet from the client device 105 that requests a certain type of file or other object from a web service over the Internet 150, the traffic manager module may, based on rules or directions invoked in the script for that type of file, redirect the connection to the content optimizer service 135. If the requested file or other object is already stored at the content cache 140 in a format suitable for the client device 105, the content optimizer service 135 may stream the file to the client device 105 from the content cache 140. If the requested file or other object is stored at the content cache 140 in a format that is not suitable for the client device 105, the content optimizer service 135 may reformat the stored file and stream it to the client device 105. If the requested file is not stored at the content cache 140, the content optimizer service 135 may request the file over the Internet 150 from the network service 145 or other source specified by the client device 105 in the original request. The content optimizer service 135 may reformat the received file as appropriate and the traffic manager module 130 may stream the reformatted file to the mobile client device 105.

In additional or alternative examples, the traffic manager module 130 may perform application layer inspection on one or more packets received on a proxy connection in response to a message containing a request made on behalf of the client device 105. The traffic manager module 130 may determine that the inspected packets are contain a certain type of file and forward the packets to the content optimizer service 135 for reformatting or other optimization prior to transmitting the packets to the client device 105. In certain examples, the content optimizer service 135 may determine that the file is already stored at the content cache 140, terminate the proxy connection providing the file, and stream the file directly to the client device 105 from the content cache 140.

Thus, through the use of message inspection at the application layer, the traffic manager module 130 may forward or redirect certain types of messages and responses to the content optimizer service 135 or another network service 145, and connections associated with the transmittal of other types of files or information may bypass the content optimizer service 135 altogether, thereby reducing congestion at the content optimizer service 135 and increasing overall throughput in the system 100. The message inspection may include application layer inspection. One example of application layer inspection may include deep packet inspection.

Figure 2:
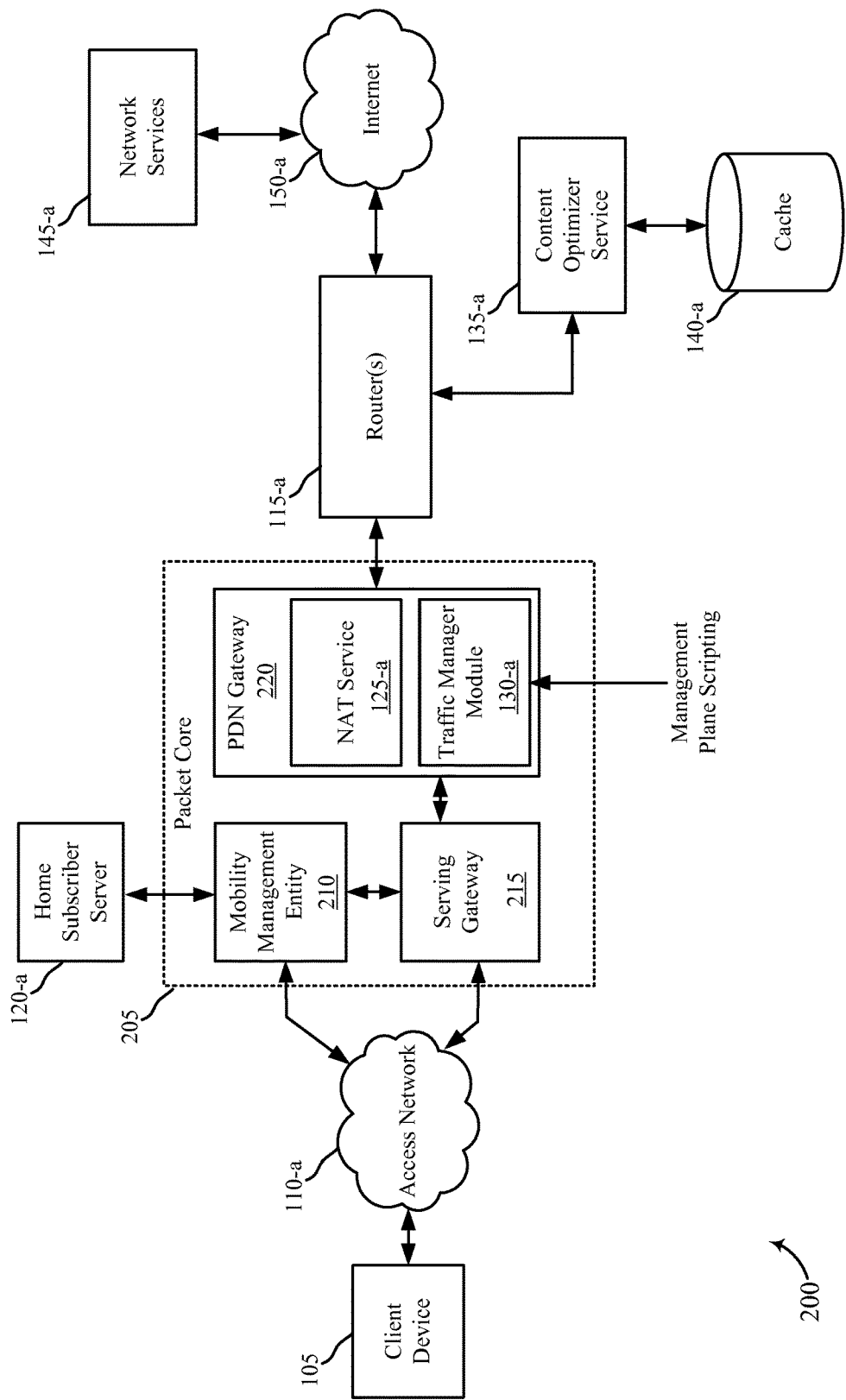
FIG. 2 is a block diagram of another example of a network incorporating a traffic manager module according to various embodiments of the invention.

FIG. 2 is a block diagram of another example of a system 100 incorporating a traffic manager module 130 that operates as a proxy to enhance network performance. The system 200 of the present example may include a client device 105-*a*, an access network 110-*a*, a packet core 205, a home subscriber server 120-*a*, one or more network routers 115-*a*, at least one content optimizer service 135-*a*, a content cache 140-*a*, and one or more network services 145-*a* available over a connection to the Internet 150-*a* or another packet data network. Each of the services 120, 125, 135, 145 of FIG. 2 may be implemented by one or more network devices (e.g., servers). Each of the components of FIG. 2 may be in communication with the other components, directly or indirectly. The system 200 of FIG. 2 may be an example of the system 100 of FIG. 1.

In certain examples, the access network 110-*a* may be a cellular radio access network, and the packet core 205 may be a mobile packet core configured to operate with the cellular radio access network. In such examples, the packet core 205 may include at least a mobility management entity 210, a serving gateway 215, and a packet data network (PDN) gateway 220.

The mobility management entity 210 may serve as a control node for the access network 110-*a*. The mobility management entity 210 may be responsible for client device 105-*a* tracking and paging, and may also be responsible for selecting a serving gateway 215 for the client device 105-*a*. The mobility management entity 210 may be involved in bearer setup and deactivation to implement a bearer plane (i.e. user plane) of the packet core 205. The mobility management entity 210 may communicate with the home subscriber server 120-*a* to authenticate the client device 105. The home subscriber server 120-*a* may be an example of the authentication service 120 of FIG. 1.

The serving gateway 215 may route and forward user data packets along the bearer plane between the client device 105-*a* and the PDN gateway 220. The serving gateway 215 may also act as a mobility anchor for the client device 105-*a*, thereby allowing the client device 105-*a* to maintain the same network address as the client device 105-*a* moves throughout the coverage area of the access network 110-*a*.

The PDN gateway 220 may provide connectivity to the Internet 150-*a* or other PDNs for the client device 105. The PDN gateway 220 may perform policy enforcement, packet filtering, charging support, and packet screening. In the present example, the PDN gateway 220 may implement the functionality of a NAT service 125-*a* and a traffic manager module 130*aa*, as described above with reference to FIG. 1.

Thus, the traffic manager module 130-*a* of the PDN gateway 220 may be configured to perform application layer packet inspection on messages exchanged between the client device 105 and one or more network services 145-*a*. The traffic manager module 130-*a* may perform performance enhancing actions based on the application layer packet inspection to improve the bandwidth, efficiency, and/or user experience of the bearer plane of the system 200. In certain examples, the traffic manager module 130-*a* may serve as a proxy between the client device 105-*a* and one or more services 135-*a*, 145-*a*. The traffic manager module 130-*a* may further allow for adaptability and scalability of the performance enhancement actions through the use of management plane scripting. The traffic manager module 130-*a* may receive a script over a management plane of the packet core 205 (e.g., via a shell interface, an API, an administrator page, etc.), interpret the script to identify a traffic management policy, and dynamically modify at least one aspect of a proxy connection over the bearer plane of the packet core 205 based on the identified traffic management policy.

Figure 3:
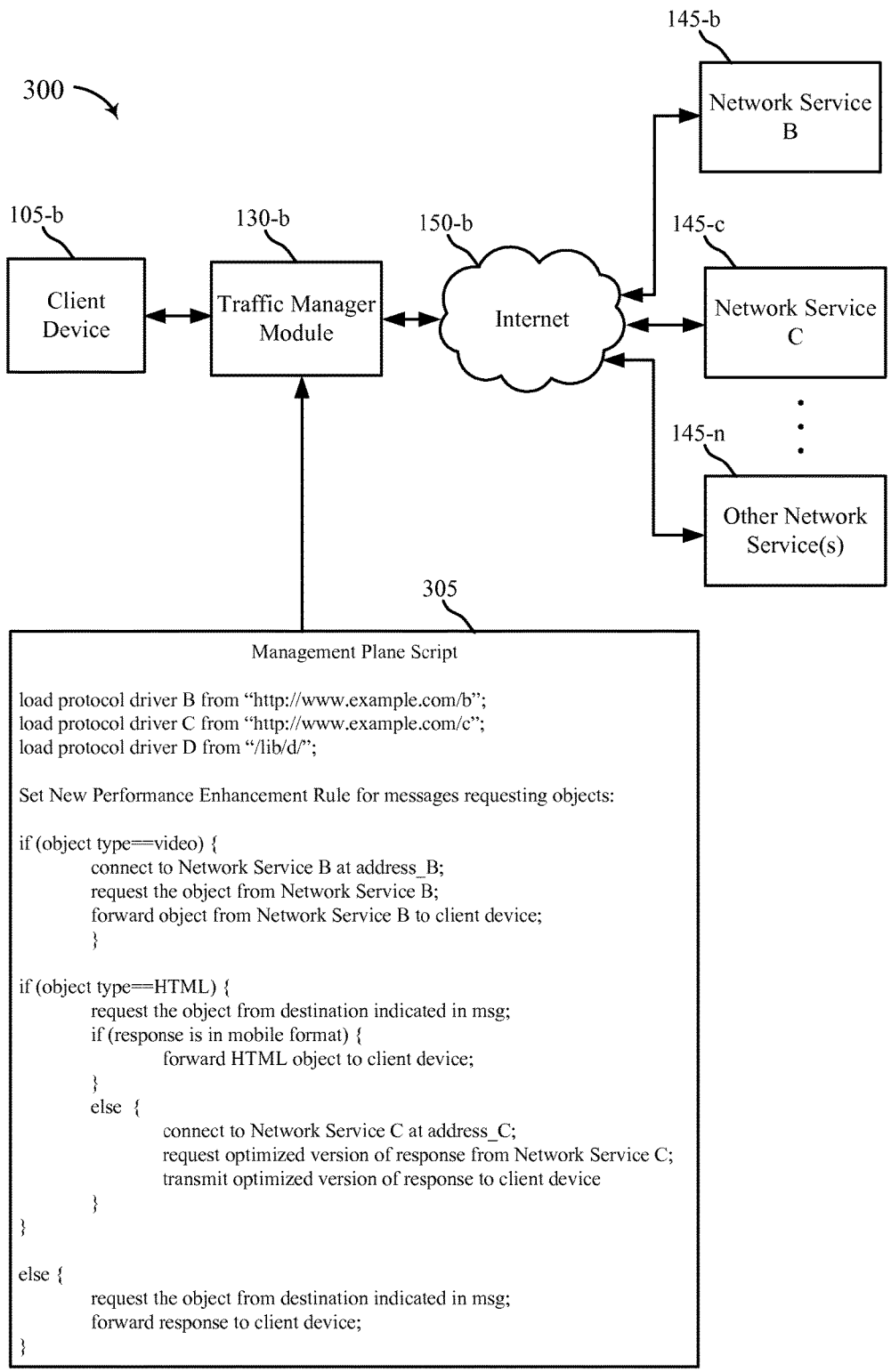
FIG. 3 is a block diagram of an example of scripting policy-based traffic management for a traffic manager module according to various embodiments of the invention.

FIG. 3 is a block diagram of an example of scripting policy-based traffic management for a traffic manager module 130-*b* of a system 300 according to various embodiments of the invention. The system 300 may include a client device 105-*b*, a traffic manager module 130-*b*, and a number of network services 145 available over the Internet 150-*b* or another packet data network. The system 300 of FIG. 3 may be an example of one or more of the systems 100, 200 of FIGS. 1-2. For the purpose of clarity in illustration, only the client device 105-*b*, traffic manager module 130-*b*, the Internet 150-*b*, and the network services 145 are shown in FIG. 3. Nevertheless, in certain examples one or more of the other components depicted in FIGS. 1 and 2 may be included in the system 300. Each of the network services 145 of FIG. 3 may be implemented by one or more network devices (e.g., servers). Each of the components of FIG. 3 may be in communication with the other components, directly or indirectly.

In the present example, a management plane script 305 may be provided to the traffic manager module 130-*b* over a management plane. The traffic manager module 130-*b* may receive the script over a management console, an administrator web page, through code stored on a removable or permanent storage device, through a software update received over a network, or through another means by which an administrator may provide the management plane script 305 to the traffic manager module 130-*b*. The management plane script 305 may be used to set up performance enhancement rules and/or provide other traffic management configurations to the traffic manager module 130-*b*. While the management plane script 305 of FIG. 3 is represented in pseudocode, the management plane script 305 may conform to a syntax understood by a script interpreter element of the traffic manager module 130-*b*.

Upon receiving the management plane script 305 at the traffic manager module 130-*b*, the traffic manager module 130-*b* may begin interpreting the management plane script 305 to identify new traffic management policies or modifications to existing traffic management policies, then dynamically modify at least one aspect of a proxy connection over the bearer plane of a packet core based on the identified new or modified traffic management policie(s). In the present example, the management plane script 305 may begin with instructions to load software extensions defined by the script. As shown in FIG. 3, the software extensions may include protocol drivers. These software extensions may be loaded from internet locations (e.g., protocol drivers B and C) or from disk (e.g., protocol driver D). Once loaded, the software extensions may be used by the traffic manager module to communicate with one or more network devices (i.e., servers implementing network services 145) based on the management plane script 305.

The management plane script 305 may then identify a traffic management policy. In the present example, the traffic management policy is a new performance enhancement rule to be implemented at the traffic manager module 130-*b* for all messages from the client device 105-*b* that request a network object (e.g., a file, streaming content, web page, document, or other object). The traffic manager module 130-*b* may identify the messages requesting network objects by performing application layer inspection on the messages transmitted by the client device 105-*b*. In certain examples, the traffic manager module 130-*b* may only perform the application layer inspection on a subset of the messages transmitted by the client device 105-*b,* and thus may only identify a subset of the applicable messages from the client device 105-*b.*

In the present example, the new performance enhancement rule may specify that if, based on application layer inspection of the message, the type of object requested is determined to be a video, the traffic manager module 130-*b* is to connect to network service B 145-*b* using protocol driver B at a specified address. The traffic manager module 130-*b* may then request the object from network service B 145-*b.* In certain examples, network service B 145-*b* may provide a cached and/or optimized version of the requested object to the traffic manager module 130-*b.* The traffic manager module 130-*b* may then forward the object received from network service B 145-*b* to the client device 105-*b.*

As further shown in FIG. 3, the new performance enhancement rule may additionally specify that if, based on the application layer inspection of the message, the type of object requested is determined to be a web page (an "HTML object"), the traffic manager module 130-*b* is to request the specified web page from the network service 145 indicated in the message from the client device 105-*b.* If the web page received from the network service 145 is determined to be in a mobile-optimized format, the traffic manager module 130-*b* may forward the web page to the client device without modification. If the web page received from the network service 145 is not in a mobile-optimized format, the traffic manager module 130-*b* may connect to network service C 145-*c* at a specified address, request an optimized version of the web page from network service C 145-*c,* and forward the optimized version of the response to the client device 105-*b.*

As further shown in FIG. 3, the new performance enhancement rule may specify that if the requested object is neither a video nor an HTML web page, the traffic manager module 130-*b* is to request the object from the network service specified in the message from the client device 105-*b,* then forward the response from the indicated network service to the client device 105-*b.*

Figure 4:
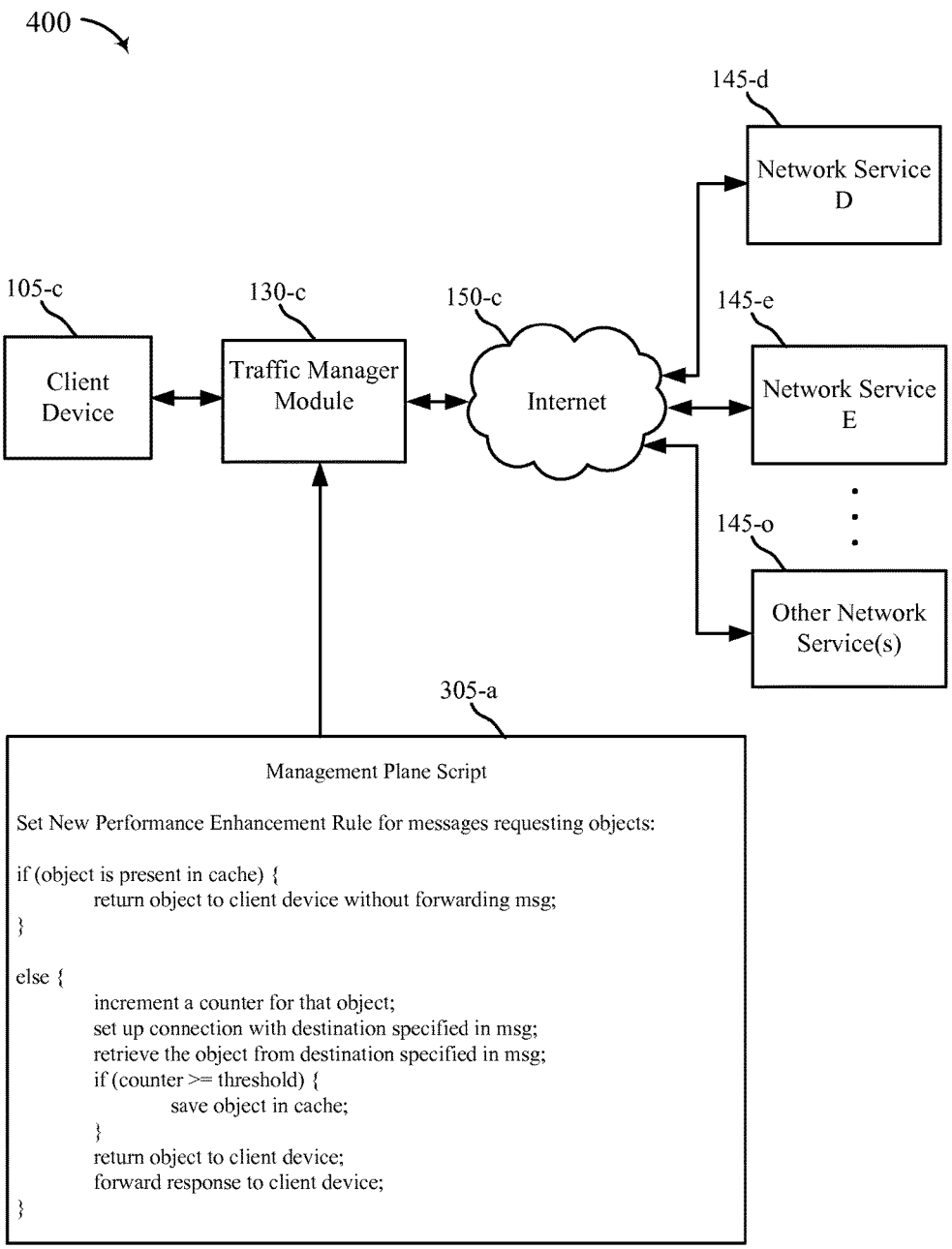
FIG. 4 is a block diagram of another example of scripting policy-based traffic management for a traffic manager module according to various embodiments of the invention.

FIG. 4 is a block diagram another example of scripting policy-based traffic management for a traffic manager module 130-*c* of a system 400 according to various embodiments of the invention. The system 400 may include a client device 105-*c,* a traffic manager module 130-*c,* and a number of network services 145 available over the Internet 150-*c* or another packet data network. The system 400 of FIG. 4 may be an example of one or more of the systems 100, 200, 300 of FIGS. 1-3. For the purpose of clarity in illustration, only the client device 105-*c,* traffic manager module 130-*c,* the Internet 150-*c,* and the network services 145 are shown in FIG. 4. Nevertheless, in certain examples one or more of the other components depicted in FIGS. 1 and 2 may be included in the system 400. Each of the network services 145 of FIG. 4 may be implemented by one or more network devices (e.g., servers). Each of the components of FIG. 4 may be in communication with the other components, directly or indirectly.

As in FIG. 3, a management plane script 305-*a* may be provided to the traffic manager module 130-*c* of FIG. 4. The management plane script 305-*a* may identify a traffic management policy to be implemented at the traffic manager module 130-*c.* In the present example, the management plane script 305-*a* may provide a new performance enhancement rule to be performed at the traffic manager module 130-*c* with respect to messages received from the client device 105-*c* that request network objects. The traffic manager module 130-*c* may identify these messages based on application layer inspection of some or all of the messages received from the client device 105-*c.*

For each message received from the client device 105-*c* that is identified as containing a request for a network object, the performance enhancement rule may specify that if the requested network object is present in a cache maintained by or accessible to the traffic manager module 130-*c,* the traffic manager module 130-*c* may return the object to the client device 105-*c* from the cache without forwarding the message to its intended destination network service 145. If the requested network object is not present in the cache, the performance enhancement rule may specify that the traffic manager module is to increment a counter for that network object (which may include initializing a new counter for a previously unrequested network object), set up a connection with the destination network service 145 specified in the message from the client device 105-*c,* and retrieve the requested network object from the specified destination network service 145. If the counter for the requested network object is greater than or equal to a specified threshold (e.g., 10), then the network object may be considered a popular network object, and the traffic manager module 130-*c* may save the network object in its cache. In any event the network object may be returned to the client device 105-*c* in response to the message from the client device 105-*c.*

Figure 5:
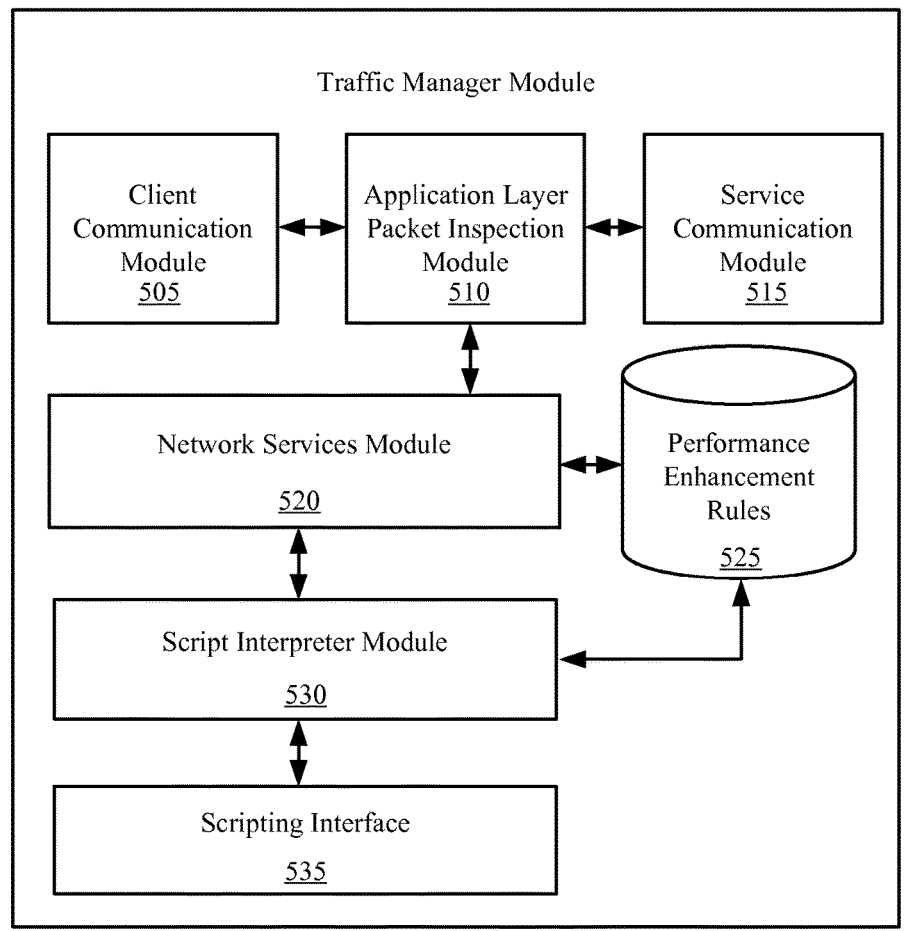
FIG. 5 is a block diagram of an example of a traffic manager module according to various embodiments of the invention.

FIG. 5 is a block diagram of an example traffic manager module 130-*d.* The traffic manager module 130-*d* may be an example of one or more of the traffic manager modules 130 described above with reference to FIGS. 1-4. The traffic manager module 130-*d* may include a client communication module 505, an application layer packet inspection module 510, a service communication module 515, a network services module 520, a data store of performance enhancement rules 525, a script interpreter module 530, and a scripting interface module 535. Each of these components may be in communication with one another, directly or indirectly. A processor running computer-readable program code stored on a memory may implement one or more of the components of the traffic manager module 130-*d.* Additionally or alternatively, special-purpose hardware may implement one or more of the components of the traffic manager module 130-*d.*

The client communication module 505 may be configured to establish a connection with one or more client devices, and the service communication module 515 may be configured to establish a proxy connection to one or more services on behalf of the client device(s). The application layer packet inspection module 510 may be configured to inspect and analyze the application layer contents of packets associated with the client device(s) or the service(s) and cause the network services module 520 to take one or more performance enhancement actions based on the application layer content of the analyzed packets to implement a traffic management policy.

The scripting interface module 535 may interact with an administrative user or process to receive a script for dynamically configuring the operation of the network services module 520. A script interpreter module 530 may interpret the received script to identify a traffic management policy. The script interpreter module 530 may configure and invoke a number of performance enhancement rules 525 governing the behavior of the network services module 520 to implement the identified traffic management policies of the network. According to the performance enhancement rules in place, the network services module 520 may dynamically modify at least one aspect of a proxy connection over a bearer plane of a packet core based on the identified traffic management policy. The network services module 520 may take certain performance enhancement actions with respect to connections with client devices or external network services to optimize the flow of data through the traffic manager module 130-*d*. The performance enhancement rules 525 may be triggered based on application layer data in packets received at the traffic manager module 130-*d*, other types of data in packets received at the traffic manager module 130-*d*, or external or internal triggering events (e.g., time-of-day, timer, system state, etc.). Additionally or alternatively, the performance enhancement rules 525-*a* in place may be generally applicable to all network traffic or only applicable to a certain subset of connections or transactions managed by the traffic manager module 130-*d*.

Figure 6:
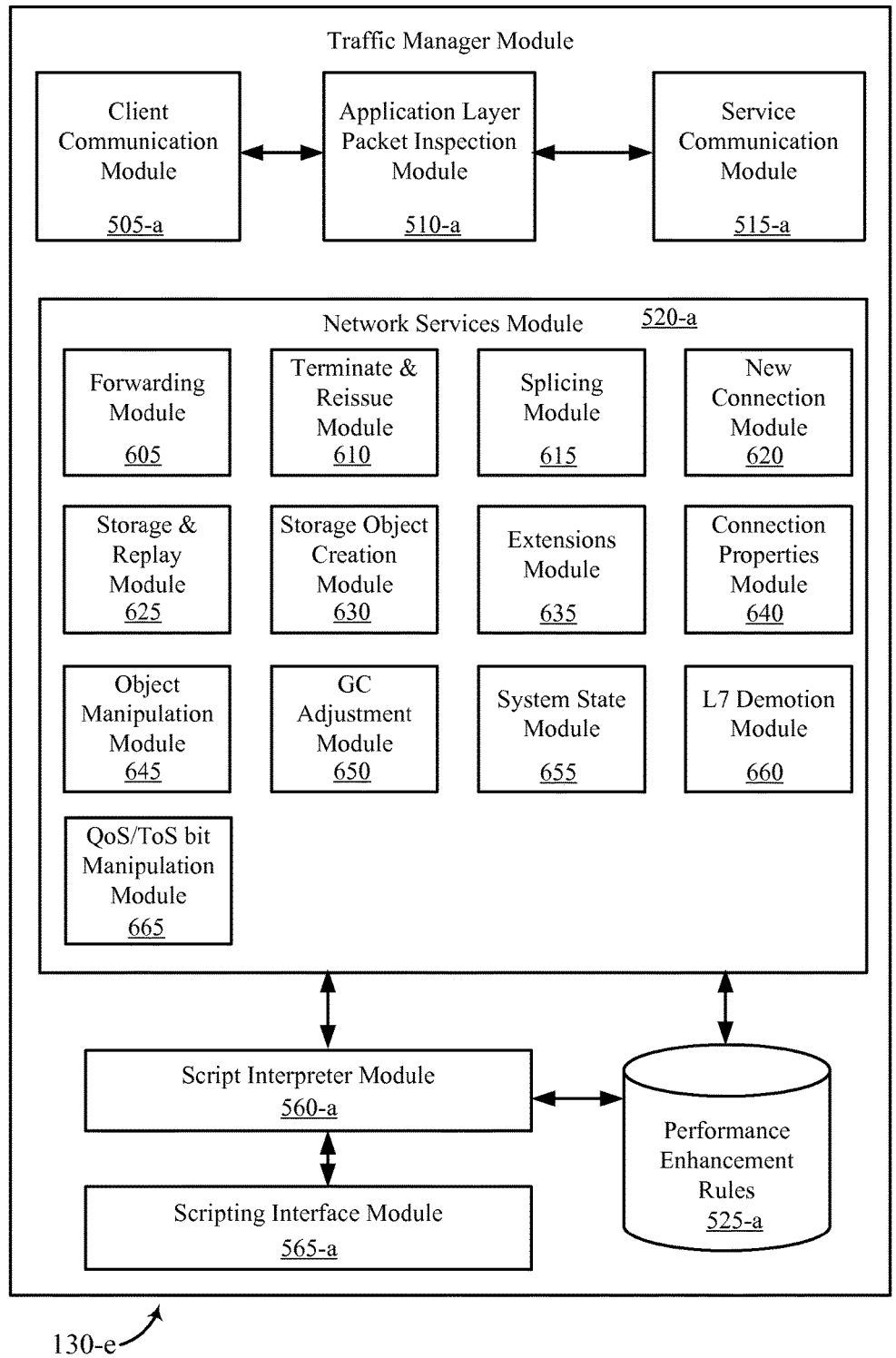
FIG. 6 is a block diagram of another example of a traffic manager module according to various embodiments of the invention.

FIG. 6 is a block diagram of a more detailed example of a traffic manager module 130-*e*. The traffic manager module 130-*e* may be an example of one or more of the traffic manager modules 130 described above with reference to the previous Figures. Accordingly, the traffic manager module 130-*e* may include a client communication module 505-*a*, an application layer packet inspection module 510-*a*, a service communication module 515-*a*, a network services module 520-*a*, a scripting interface module 535-*a*, a script interpreter module 530-*a*, and a data store of performance enhancement rules 525-*a*, as described above with respect to FIG. 5. Each of these components may be in communication with one another, directly or indirectly.

The network services module 520-*a* may include a number of modules configured to take performance enhancement actions with respect to traffic passing through the traffic manager module 130-*e* based on the performance enhancement rules 525-*a* in place. At least a portion of the performance enhancement rules 525-*a* in place may be programmatically set using scripts. In the present example, the network services module 520-*a* may include a forwarding module 605, a terminate and reissue module 610, a splicing module 615, a new connection module 620, a storage and replay module 625, a storage object creation module 630, an extensions module 635, a connection properties module 640, an object manipulation module 645, a garbage collection adjustment module 650, a system state module 655, a layer 7 demotion module 660, and a Quality of Service (QoS)/Type of Service (ToS) manipulation module 665.

The forwarding module 605 may be configured to programmatically redirect one or more messages from a client device or responses from a network service to an intermediate network service or alternate destination. For example, the forwarding module 605 may, based on an application layer inspection of one or more messages from the client device carrying a request for a video, forward or redirect the message from the client device to a video optimizer service. The application layer criteria for selecting the message for forwarding and the intermediate network service or alternate destination may be provided to the network services module 520-*a* with a script interpreted by the script interpreter module 560-*a*.

The terminate and reissue module 610 may be configured to programmatically terminate a connection to a first network service based on one or more messages from a client device and/or one or more responses intended for the client device. The terminate and reissue module 610 may further be configured to instruct the client device to reissue the message to a different network service. For example, the terminate and reissue module 610 may determine from the application layer analysis of one or more messages that the client device is requesting a video object from a first network service. In response, the terminate and reissue module 610 may terminate the request to the first network service and reissue a request for the video object on behalf of the client device to a video optimizer service or instruct the client device to reissue the request to the video optimizer service.

The splicing module 615 may programmatically mirror data from one connection to another connection or combine data from multiple connections into a single output stream. For example, the splicing module 615 may determine that a stream of packets from a network service to a first client device is relevant to a request from a second client device and mirror the content of the packets to the second client device. In one example, the splicing module 615 may create a bridge between two connections that terminates after a certain amount of time or in response to a trigger. In certain examples, the parameters and conditions for splicing the two connections may be set by the one or more scripts received at the scripting interface module 565-*a*.

The new connection module 620 may programmatically generate a new connection to a client device or a network service when a set of criteria have been met. The set of criteria may be defined by one or more scripts received at the scripting interface module 565-*a*. In certain examples, the new connection may be generated based on the content of a message or response inspected at the application layer packet inspection module 510-*a*. In certain examples, the parameters and conditions for setting up the new connection and the protocol for communicating over the new connection with the client device or network service may be set by the one or more scripts.

The storage and replay module 625 may be configured to programmatically store certain actions or communications (e.g., requests from client devices, responses from services, etc.) and replay those actions in response to a trigger or a certain set of criteria being met. For example, the storage and replay module 625 may be configured to identify, based on application layer inspection of messages and responses to the messages, popular network objects and cache those network objects at the network services module 520-*a*. Thus, when a popular network object is requested by a client device, the storage and replay module 625 may respond to the request without having to request the network object from the network service indicated by the client device. The parameters and conditions for identifying actions or communications to store and replaying those communications over other connections may be specified by one or more scripts received at the scripting interface module 565-*a*.

The storage object creation module 630 may be configured to programmatically create storage objects as defined and instantiated by the script. The storage objects may be created based on the content of a request or response received at the traffic manager module or based on other criteria. For example, as described above, upon detecting similarities in the application layer content of a number of request or response packets passing through the traffic manager module 130-*e*, the storage object creation module 630 may implement a caching policy to create and store popular network objects at the network services module 520-*a*. The parameters and conditions for identifying network objects to create and store may be specified by one or more scripts received at the scripting interface module 565-*a*.

The extensions module 635 may enable the traffic manager module 130-*e* to support extensions to the functionality or performance enhancement rules 525-*a* of the traffic manager module 130-*e* written in general purpose language. For example, the extensions module 635 may enable the traffic manager module 130-*e* to load and use a protocol driver, thereby allowing the network services module 520-*a* to communicate with a particular network service. In certain examples, the extensions may be implemented or integrated into the traffic manager module 130-*e* using one or more scripts received at the scripting interface module 565-*a*.

The connection properties module 640 may be configured to programmatically alter certain aspects of a connection with a client device or a network service based on the content of a message or response to the message, or other criteria defined by the performance enhancement rules 525-*a* in place. For example, the traffic manager module 130-*e* may detect a type of network or client device used in a client connection and select a congestion algorithm accordingly. The parameters and conditions for making modifications to the connection properties may be specified by one or more scripts received at the scripting interface module 565-*a*.

The object manipulation module 645 may be configured to programmatically manipulate objects in messages or responses processed by the traffic manager module 130-*e*. For example, the object manipulation module 645 may detect a portion of a video object from an application layer inspection of a response packet and dynamically change one or more aspects of the video object in the response packet before forwarding the response packet to a client device. In certain examples, the object manipulation module 645 may additionally or alternatively add, change, or remove headers associated with certain packets. The parameters and conditions for manipulating objects and/or packet headers may be specified by one or more scripts received at the scripting interface module 565-*a*.

The garbage collection adjustment module 650 may be configured to programmatically manipulate the garbage collection operations of the traffic manager module 130-*e*. For example, one or more scripts received at the scripting interface module 565-*a* may specify the maximum number of connections allowed to a specific external service at one time. If the number of connections to external service exceeds the maximum, the traffic manager module 130-*e* may tear down one or more inactive connections.

The system state module 655 may be configured to programmatically alter a state of the traffic manger module 130-*e* based on certain criteria. For example, upon detecting similarities in the application layer content of a number of messages or responses passing through the traffic manager module 130-*e*, the system state module 655 may implement a caching policy. The parameters and conditions for manipulating the system state may be specified by one or more scripts received at the scripting interface module 565-*a*.

The demotion module 660 may be configured to programmatically demote certain connections to lower layers or different protocols. For example, the demotion module 660 may demote a layer 7 connection to a lower-level connections (e.g., a layer 5 connection) based on the content of packets in the layer 7 connection. In one example, the traffic manager module 130-*e* may receive an application layer connection on TCP port 80 and, based on the content of one or more packets associated with the connection, determine that the connection is not a hypertext transport protocol (HTTP) connection. As a consequence of this discovery, the layer 7 demotion module 660 may stop parsing the data and forward all received data as is at the session layer. The parameters and conditions for manipulating connection demotion may be specified by one or more scripts received at the scripting interface module 565-*a*.

The QoS/ToS bit manipulation module 665 may be configured to programmatically adjust one or more QoS parameters associated with a connection. For example, where the traffic manager module 130-*e* serves as a proxy between multiple client devices and a network service, the traffic manager module 130-*e* may dynamically adjust the ToS bits of packets transmitted over a connection with the network service based on one or more QoS parameters associated with the message (or source client device of the message) currently being transmitted. The parameters and conditions for manipulating QoS and ToS parameters may be specified by one or more scripts received at the scripting interface module 565-*a*.

Figure 7:
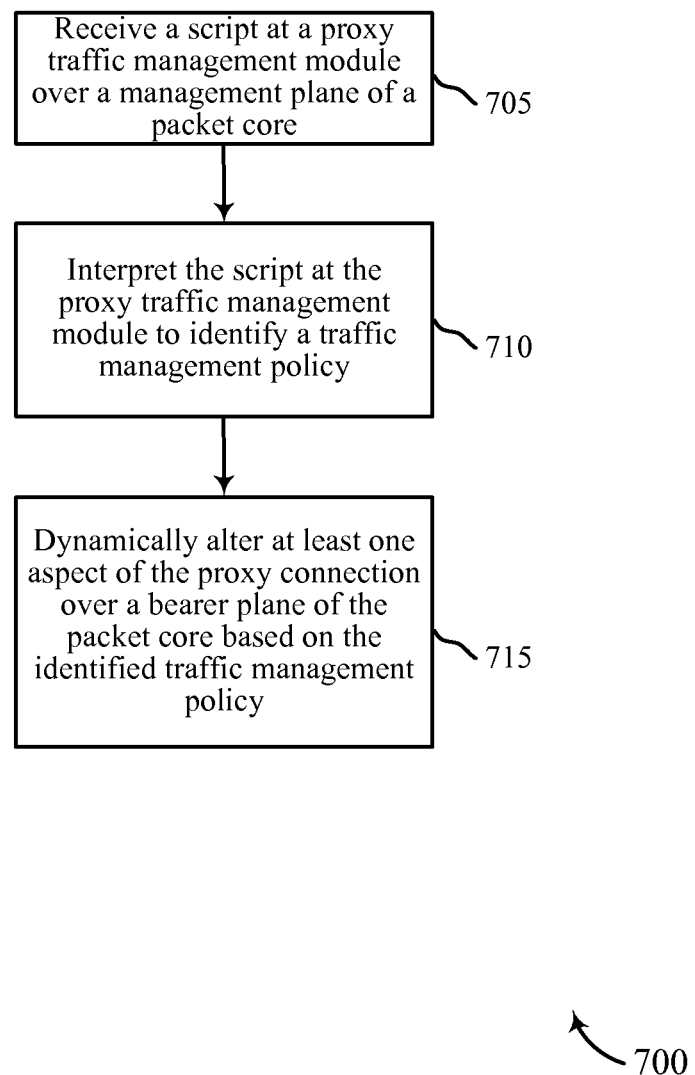
FIG. 7 is a flowchart diagram of an example of a method of managing traffic in a traffic manager module of a network according to various embodiments of the invention.

FIG. 7 is a flowchart diagram of an example method 700 of managing traffic in a proxy traffic manager module of a network. The traffic manager module may be an example of one or more of the traffic manager modules 130 described above with respect to previous Figures. Accordingly, one or more of the traffic manager modules 130 and/or the hardware implementing the traffic manager modules 130 may be means for performing the functionality of method 700.

At block 705, the traffic manager module may receive a script at a proxy traffic management module over a management plane of a packet core. At block 710, the script may be interpreted at the proxy traffic management module to identify a traffic management policy. At block 715, at least one aspect of a proxy connection over a bearer plane of the packet core may be dynamically altered based on the identified traffic management policy. In certain examples, the modification of the proxy connection may be further based on an application layer inspection of messages associated with the proxy connection that are received at the traffic manager module. The identified traffic management policy may be of general applicability or applicable on a per-connection basis.

Figure 8:
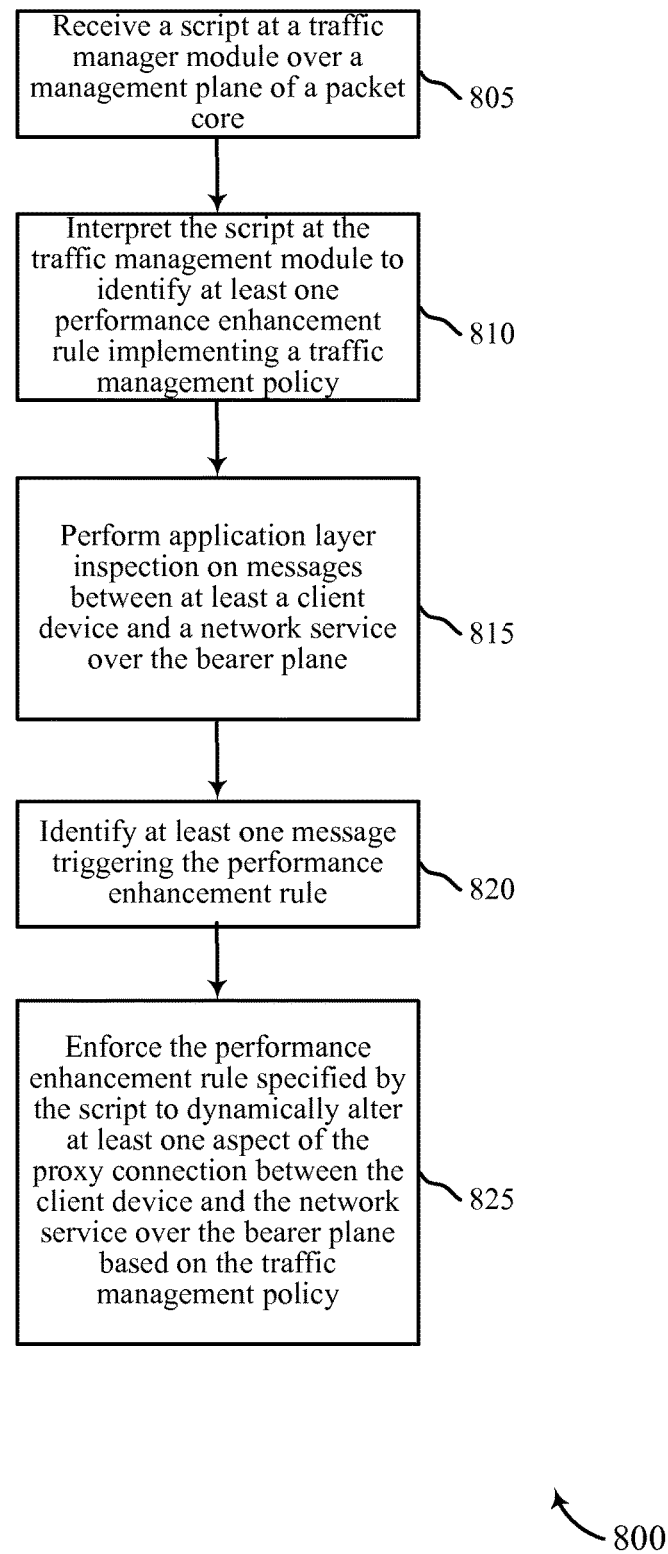
FIG. 8 is a flowchart diagram of another example of a method of managing traffic in a traffic manager module of a network according to various embodiments of the invention.

FIG. 8 is a flowchart diagram of an example method 800 of managing traffic in a proxy traffic manager module of a network. The traffic manager module may be an example of one or more of the traffic manager modules 130 described above with respect to previous Figures. Accordingly, one or more of the traffic manager modules 130 and/or the hardware implementing the traffic manager modules 130 may be means for performing the functionality of method 800.

At block 805, the traffic manager module may receive a script at a proxy traffic management module over a management plane of a packet core. At block 810, the script may be interpreted at the proxy traffic management module to identify at least one performance enhancement rule implementing a traffic management policy. At block 815, application layer inspection may be performed on messages between at least a client device and a network device over a bearer plane of the packet core. At block 820, at least one message triggering the performance enhancement rule may be identified based on the application layer inspection. At block 825, the performance enhancement rule specified by the script may be enforced to dynamically alter at least one aspect of a proxy connection between the client device and the network service over a bearer plane of the packet core. The performance enhancement rule may be enforced based on the identified traffic management policy.

Figure 9:
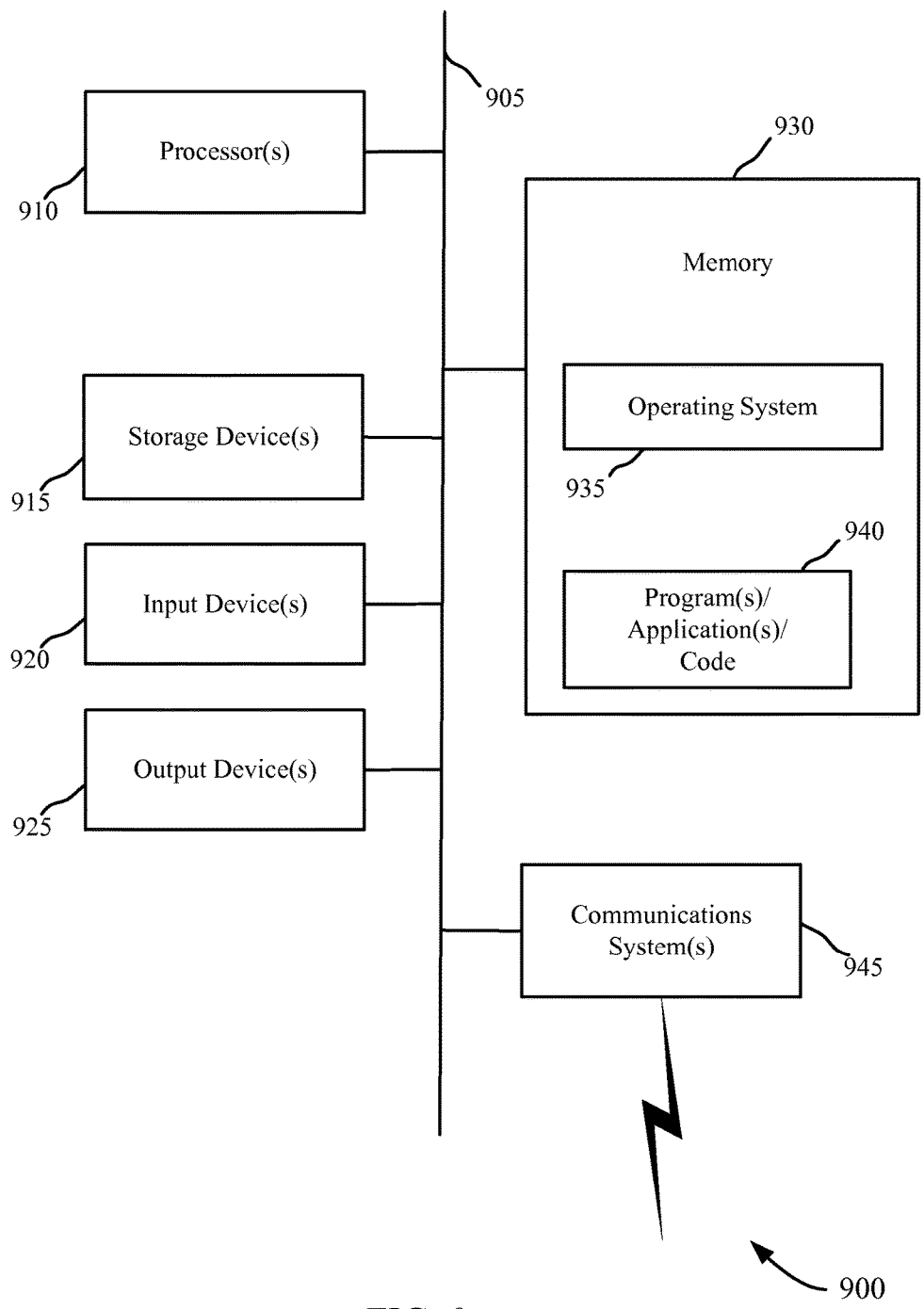
FIG. 9 is a schematic diagram that illustrates a representative device structure that may be used in various embodiments of the present invention.

A device structure 900 that may be used for a traffic manager module 130, a client device 105, a service 120, 125, 135, 145, or other computer-based devices described herein, is illustrated with the schematic diagram of FIG. 9. This drawing broadly illustrates how individual system elements of each of the aforementioned devices may be implemented, whether in a separated or more integrated manner. The exemplary structure is shown comprised of hardware elements that are electrically coupled via bus 905, including processor(s) 910 (which may further comprise a DSP or special-purpose processor), storage device(s) 915, input device(s) 920, and output device(s) 925. The storage device(s) 915 may be a machine-readable storage media reader connected to any machine-readable storage medium, the combination comprehensively representing remote, local, fixed, or removable storage devices or storage media for temporarily or more permanently containing computer-readable information. The communications systems interface 945 may interface to a wired, wireless, or other type of interfacing connection that permits data to be exchanged with other devices. The communications system(s) interface 945 may permit data to be exchanged with a network.

The structure 900 may also include additional software elements, shown as being currently located within working memory 930, including an operating system 935 and other code 940, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

The components described in the present disclosure may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a SIM card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of managing network communications, comprising:

receiving a script at a traffic manager module over a management plane of a packet core;

interpreting the script at the traffic manager module to identify a traffic management policy, wherein interpreting the script at the traffic manager module comprises loading a protocol driver defined by the script at the traffic manager module;

dynamically modifying at least one aspect of a proxy connection over a bearer plane of the packet core at the traffic manager module based on the identified traffic management policy, wherein dynamically modifying the at least one aspect of the proxy connection comprises using the protocol driver to communicate with one or more network devices based on the script; and performing, based at least in part on the script, an application layer content inspection on a message associated with the proxy connection over the bearer plane;

wherein the protocol driver is loaded based at least in part on the application layer content inspection.

2. The method of claim 1, wherein dynamically modifying the at least one aspect of the proxy connection comprises:

forwarding a message associated with the proxy connection over the bearer plane to at least one of the one or more network devices identified by the script.

3. The method of claim 1, wherein dynamically modifying the at least one aspect of the proxy connection comprises:

terminating a request associated with the proxy connection over the bearer plane; and instructing a source of the request to reissue the request to a network device identified by the script.

4. The method of claim 1, wherein dynamically modifying the at least one aspect of the proxy connection comprises:
creating a storage object based on the script.

5. The method of claim 1, wherein the protocol driver comprises a software extension and wherein dynamically modifying the at least one aspect of the proxy connection comprises:
loading the software extension defined by the script at the traffic manager module; and
using the software extension to communicate with one or more network devices based on the script.

6. The method of claim 1, wherein dynamically modifying the at least one aspect of the proxy connection comprises:
manipulating at least one object received at the traffic manager module over the proxy connection based on the script.

7. The method of claim 1, wherein dynamically altering the at least one aspect of the proxy connection comprises:
performing a demotion on one or more packets associated with the proxy connection based on the script.

8. The method of claim 7, wherein the demotion comprises demoting the proxy connection to a lower network layer.

9. The method of claim 1, further comprising:
establishing a new connection at the traffic manager module with a network device identified by the script received over the management plane of the packet core.

10. The method of claim 1, further comprising:
manipulating a garbage collection operation of the traffic manager module based on the script.

11. The method of claim 1, further comprising:
modifying a system state of the traffic manager module based on the script.

12. A traffic manager module, comprising:
at least one processor; and
a memory communicably coupled with the at least one processor, the memory configured to store code that, when executed by the at least one processor, causes the at least one processor to:
receive a script over a management plane of a packet core;
interpret the script at the traffic manager module to identify a traffic management policy, wherein interpreting the script at the traffic manager module comprises loading a protocol driver defined by the script at the traffic manager module;
dynamically modify at least one aspect of a proxy connection over a bearer plane of the packet core based on the identified traffic management policy, wherein dynamically modifying the at least one aspect of the proxy connection comprises using the protocol driver to communicate with one or more network devices based on the script; and
perform, based at least in part on the script, an application layer content inspection on a message associated with the proxy connection over the bearer plane; wherein the protocol driver is loaded based at least in part on the application layer content inspection.

13. The traffic manager module of claim 12, wherein the code causes the at least one processor to dynamically modify the at least one aspect of the proxy connection by:
forwarding a message associated with the proxy connection over the bearer plane to at least one of the one or more network device identified by the script.

14. The traffic manager module of claim 12, wherein the code causes the at least one processor to dynamically modify the at least one aspect of the proxy connection by:
terminating a request associated with the proxy connection over the bearer plane; and
instructing a source of the request to reissue the request to a network device identified by the script.

15. The traffic manager module of claim 12, wherein the code causes the at least one processor to dynamically modify the at least one aspect of the proxy connection by:
creating a storage object based on the script.

16. The traffic manager module of claim 12, wherein the protocol driver comprises a software extension, and wherein the code causes the at least one processor to dynamically modify the at least one aspect of the proxy connection by:
loading the software extension defined by the script at the traffic manager module; and
using the software extension to communicate with one or more network devices based on the script.

17. The traffic manager module of claim 12, wherein the code causes the at least one processor to dynamically modify the at least one aspect of the proxy connection by:
manipulating at least one object received at the traffic manager module over the proxy connection based on the script.

18. The traffic manager module of claim 12, wherein the code causes the at least one processor to dynamically modify the at least one aspect of the proxy connection by:
performing a demotion on one or more packets associated with the proxy connection based on the script.

19. The traffic manager module of claim 18, wherein the demotion comprises demoting the proxy connection to a lower network layer.

20. The traffic manager module of claim 12, wherein the code causes the at least one processor to:
establishing a new connection at the traffic manager module with a network device identified by the script received over the management plane of the packet core.

21. The traffic manager module of claim 12, wherein the code causes the at least one processor to:
manipulate a garbage collection operation of the traffic manager module based on the script.

22. The traffic manager module of claim 12, wherein the code causes the at least one processor to:
modify a system state of the traffic manager module based on the script.

23. A non-transitory computer-readable medium comprising computer-readable program code stored thereon, which is configured to cause at least one processor to:
receive a script at a traffic manager module over a management plane of a packet core;
interpret the script at the traffic manager module to identify a traffic management policy, wherein interpreting the script at the traffic manager module comprises loading a protocol driver defined by the script at the traffic manager module;
dynamically modify at least one aspect of a proxy connection over a bearer plane of the packet core at the traffic manager module based on the identified traffic management policy; and
perform, based at least in part on the script, an application layer content inspection on a message associated with the proxy connection over the bearer plane; wherein the protocol driver is loaded based at least in part on the application layer content inspection.

\* \* \* \* \*